Feb. 13, 1945.    L. D. MARTIN    2,369,477
METHOD AND APPARATUS FOR GEAR CHECKING
Filed March 4, 1943    5 Sheets-Sheet 1

LOUIS D. MARTIN
INVENTOR

Feb. 13, 1945. L. D. MARTIN 2,369,477
METHOD AND APPARATUS FOR GEAR CHECKING
Filed March 4, 1943 5 Sheets-Sheet 2
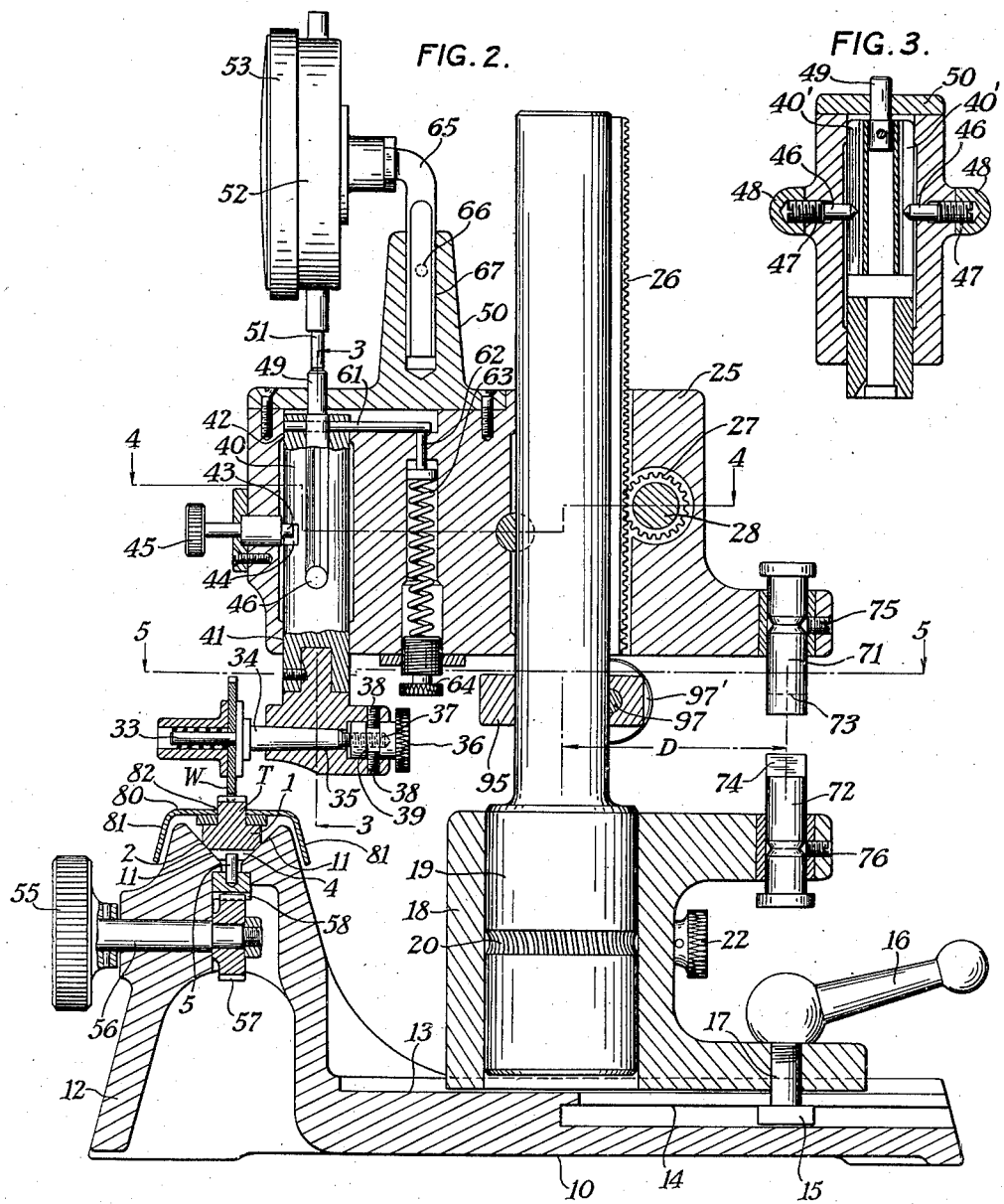
LOUIS D. MARTIN
INVENTOR Feb. 13, 1945.   L. D. MARTIN   2,369,477
METHOD AND APPARATUS FOR GEAR CHECKING
Filed March 4, 1943   5 Sheets-Sheet 3

LOUIS D. MARTIN
INVENTOR

BY
ATTORNEYS

Feb. 13, 1945.                L. D. MARTIN                 2,369,477
                METHOD AND APPARATUS FOR GEAR CHECKING
                  Filed March 4, 1943          5 Sheets-Sheet 4
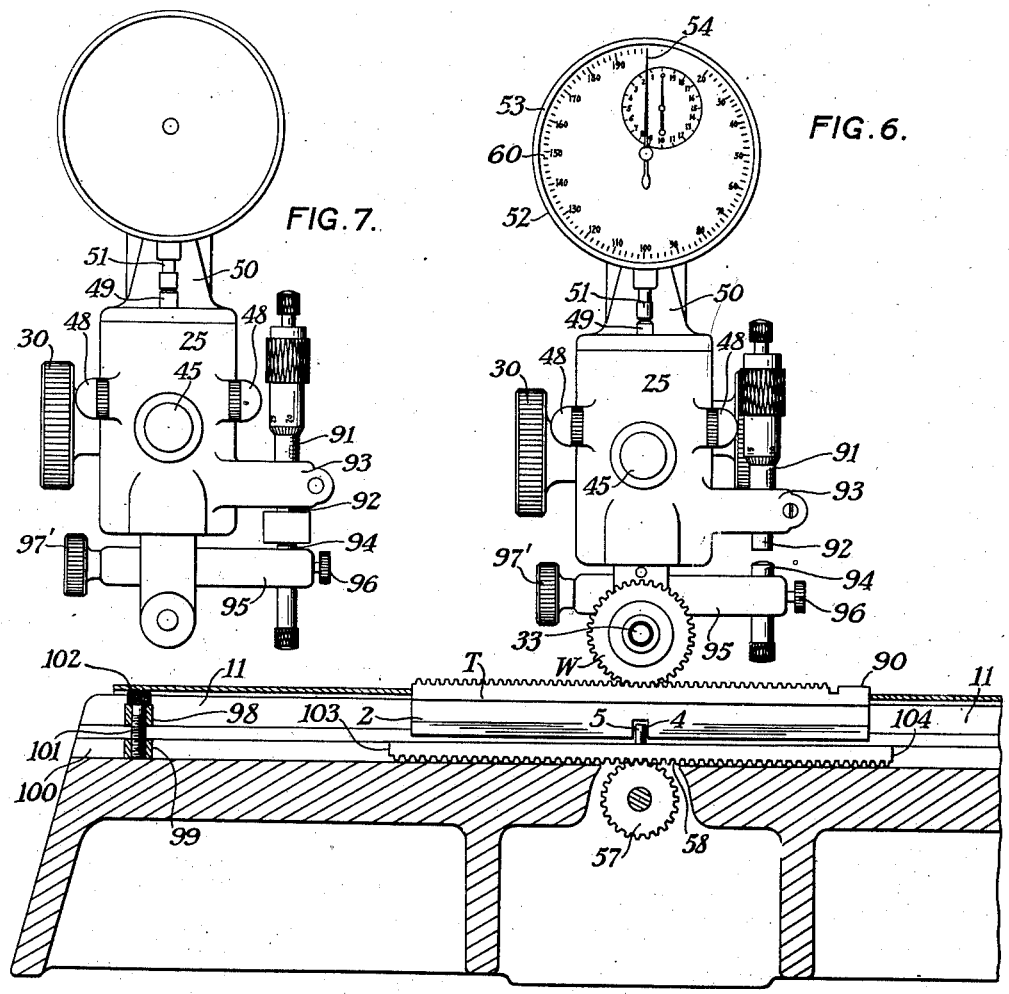
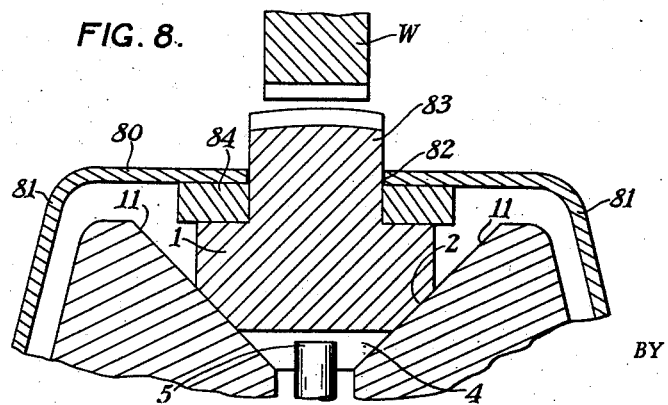
LOUIS D. MARTIN
INVENTOR
BY
ATTORNEYS Feb. 13, 1945.  L. D. MARTIN  2,369,477
METHOD AND APPARATUS FOR GEAR CHECKING
Filed March 4, 1943   5 Sheets-Sheet 5
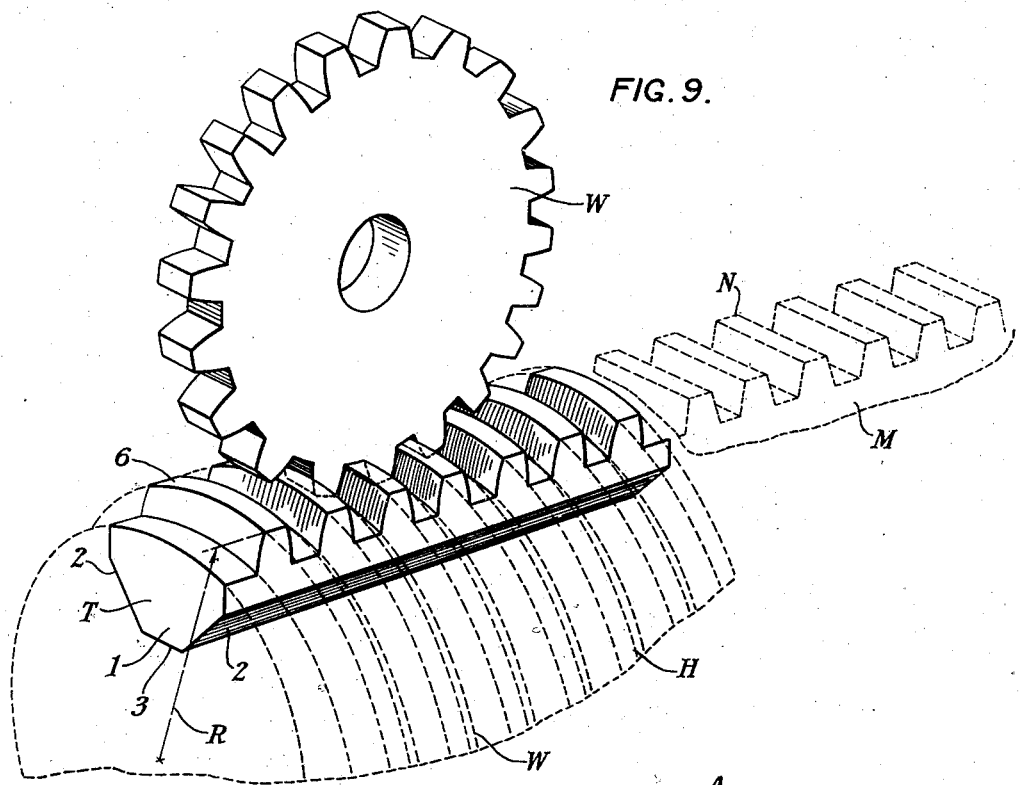
FIG. 9.
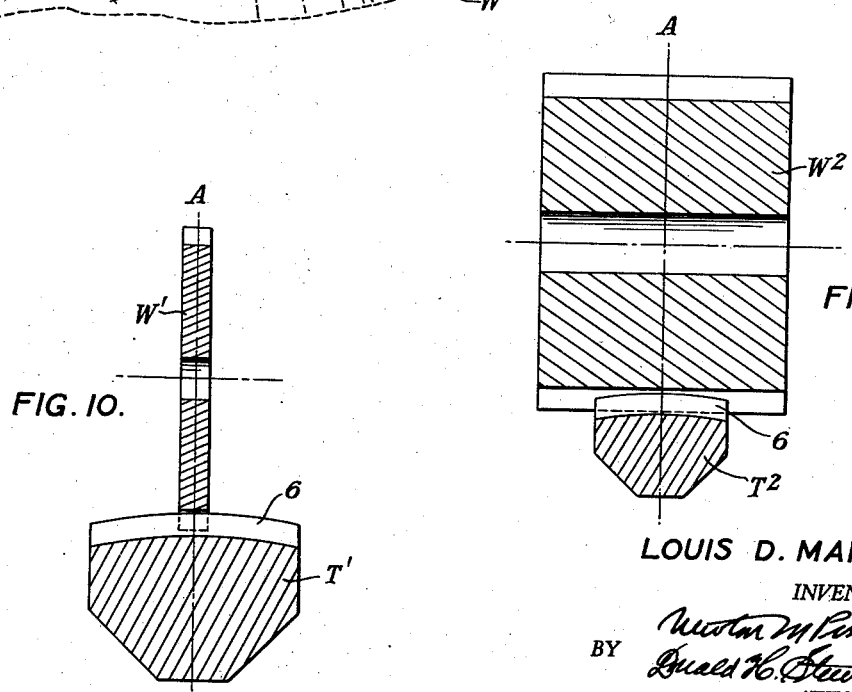
FIG. 10.
FIG. 11.
LOUIS D. MARTIN
INVENTOR
BY
ATTORNEYS Patented Feb. 13, 1945

2,369,477

UNITED STATES PATENT OFFICE 2,369,477

METHOD AND APPARATUS FOR GEAR CHECKING

Louis D. Martin, Rochester, N. Y., assignor to Eastman Kodak Company, Rochester, N. Y., a corporation of New Jersey Application March 4, 1943, Serial No. 478,044

14 Claims. (Cl. 33—179.5)

This invention relates to gear checking machines. One object of my invention is to provide a machine in which a master tool, a rack-like instrument which is actually not a true rack, is used to check a gear by moving the master tool teeth into contact with the gear teeth. Another object of my invention is to provide a checking machine having a higher degree of accuracy than known types of checking or gauging machines. Another object is to provide a machine which can be quickly set up and in which gears can be checked with considerable rapidity. Another object is to provide a machine for checking a large variety of gears from a single master tool and other objects will appear from the following specification, the novel features being particularly pointed out in the claims at the end thereof.

It has been customary to check gears by meshing and running them with master gears, measuring the distance between centers of the gears and noting the variations from the theoretically perfect. Such machines, however, cannot have a degree of accuracy exceeding that of the master gear used. Master gear eccentricity can seldom be held closer than .0005" to a desired dimension and tooth spacing and approximate shape can seldom be held closer than .0002". This, then, is an indication of the maximum accuracy that can be measured. The reason for this is that gear forming machines, including the indexing of the gears, for grinding or milling teeth are not capable of more accurate work.

I have overcome the difficulty of having the accuracy of checking depend on the accuracy of a master gear by not utilizing such a gear. I have found that a worm section has so many advantages over a master gear that a far more efficient machine can be built utilizing such a testing tool.

A master worm-section differs from a rack in that the former is in effect a section of a single spiral tooth so that the shaping and spacing of the small sections of the tooth used as successive teeth in the master worm can be ground to a dimension at least ten times as accurate as a master gear or master rack.

Such a worm section may superficially resemble a rack but it differs materially. The worm-section teeth have both a transverse curvature and a lead, and preferably the radii of curvature may be long and the lead angle slight so that often to the eye the worm section appears much the same as a rack. As the worm section used may be only a few degrees or so of the 360° of a full worm, and as a convenient pitch diameter may be relatively long, as for instance ten or twelve inches, the transverse curvature of the teeth may amount to only a few thousandths of an inch. These dimensions are only to visualize a single typical example. The worm-sections may be of any required dimension.

Such worm-sections will be the mate or conjugate of all gears of the particular gear system used. The involute curve is almost universally used today and for this reason it is preferred; but the form may be cycloidal, epicycloid, involute or any other desired tooth form.

Coming now to the drawings wherein like reference characters denote like parts throughout:

Fig. 2 is a section taken on line 2—2 of Fig. 1;

Fig. 3 is a fragmentary detail section taken on line 3—3 of Fig. 2;

Fig. 6 is a fragmentary section taken on line 6—6 of Fig. 1, parts being broken away for the sake of clearness;

Fig. 7 is a front elevation of a portion of the machine shown in Fig. 6 but with certain parts in a different position;

Fig. 8 is an enlarged fragmentary detail section showing the relation of the worm section and slideway with parts being omitted;

Fig. 9 is an enlarged perspective of a portion of a gear to be tested and a worm section, certain parts being shown on a much exaggerated scale;

Fig. 10 is a fragmentary sectional detail of a typical worm section and gear in testing relationship; and Fig. 11 is a view similar to Fig. 10 but with a somewhat different embodiment of my invention.

Figure 1:
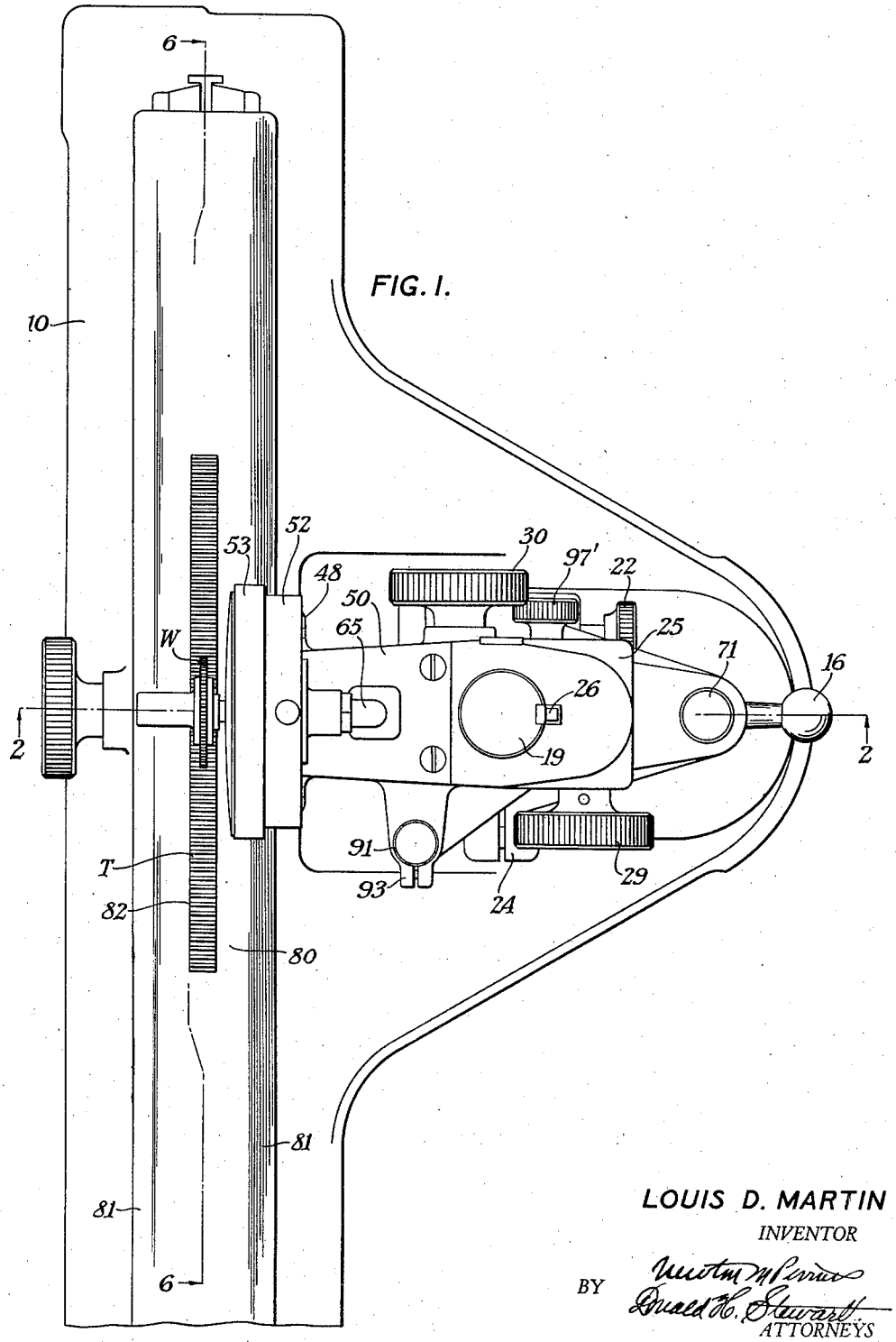
Fig. 1 is a top plan view of a gear checking machine constructed in accordance and embodying a preferred form of my invention.

My invention broadly comprises a machine on which a testing tool, which is a rack-like member, is used to test a gear by mating the rack-like member and a gear and moving one relative to the other until one complete revolution is made noting minute variations in the movement of the gear to and from the testing tool on an indicator. Thus, eccentricity, uniformity of teeth and pitch diameter can be readily checked and, if necessary, the imperfections can be noted on the gear if desired. My machine also provides a simple means for determining with extreme accuracy whether or not the pitch diameter of the gear is accurate.

Since the testing tool is an important part of the gear checking machine, it will be described first and for the more complete description of it reference may be had to my copending application entitled, "Gear testing tool," Serial No. 478,043, filed March 4, 1943, resulting in Patent No. 2,350,788, granted June 6, 1944. As indicated in this application the gear testing tool designated herein broadly as T may consist, as best shown in Fig. 9, of a bar of metal 1 which may have inclined walls 2 making the bar roughly V-shaped in cross-section. It may have a flat lower wall 3 which is provided with a notch 4 (Fig. 8) to engage a pin 5 for moving the rack-like member as will be hereinafter more fully described. It should be noted that this coupling, the notch 4 and pin 5, is a loose one and the pin is short of the bottom of the notch 4. This is to cause the worm section rails 2 to always lie firmly on the rails 11 as there can be no tendency for the pin 5 to raise the worm section from its slideway. The rack-like member is provided with teeth 6 but these teeth are not the teeth of a true rack. These teeth have both lateral curvature and lead and are conjugates of the true basic rack. Fig. 9 indicates on a much exaggerated scale that the teeth 6 may form in effect a section cut from a worm W so that actually each of the teeth 6 may be considered as a small angular section of one complete helical tooth H. Thus, the teeth 6 can be made with a degree of accuracy which is impossible in making the teeth of a true rack. A rack M, as also indicated in Fig. 9, has teeth N which must be milled or ground so that the accuracy of such teeth must depend in part upon the accuracy of an indexing machine which may move the member M each time a tooth is milled or ground. Such teeth can seldom be held closer than plus or minus approximately two ten thousandths of an inch. However, the worm section T has a far greater degree of accuracy in both the spacing and shape of the teeth 6 because these teeth may be ground as a helix on a machine in which the grinding wheel is advanced with an exceedingly accurate movement. It is believed that the teeth spacing and accurate shape of the teeth is of course largely due to the fact that actually the teeth 6 are in effect cut from one long tooth which can be accurately made because the machines for advancing the tooth grinding wheel are capable of producing exceedingly accurate leads and tooth form.

In other words the worm section T is much like a hob without relief. A worm section is the mate or conjugate of all the gears of the tooth system used for the worm section and this is true regardless of the tooth form system used in the worm section. Thus the teeth may be of the usual involute type, which is by far the most universally used today, or the tooth shape may be cycloidal, epicycloid or any other known type of tooth shape.

It is possible to test any kind of gear having the same tooth system whether the gear has teeth parallel to the gear axis or at an angle thereto as will be more fully described.

Figure 5:
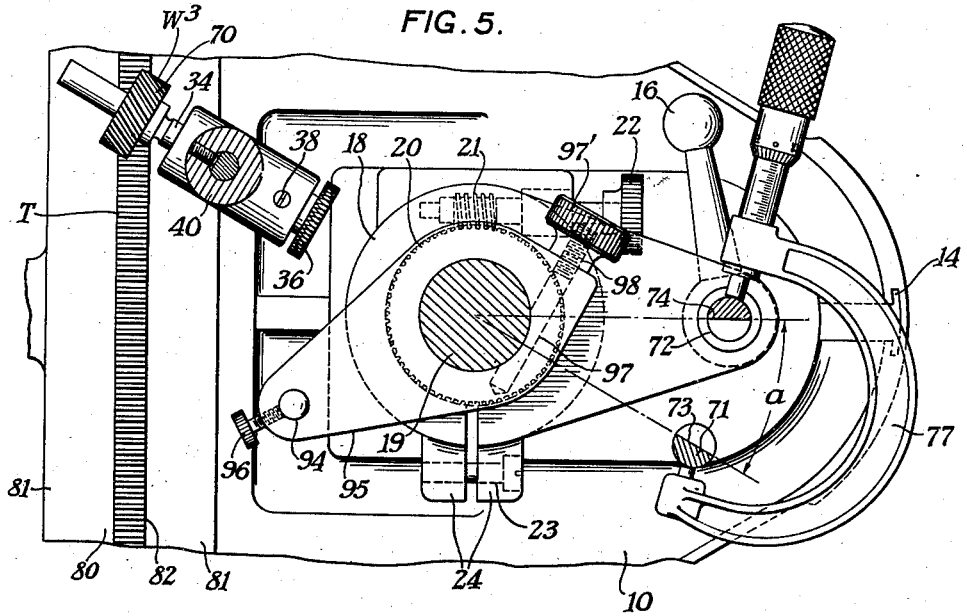
Fig. 5 is a fragmentary detail section taken on line 5—5 of Fig. 2 but with the parts in a different position.

The drawings illustrate a preferred embodiment of my machine which may consist of a base member 10 including a pair of V-shaped rails 11 extending along the front of the base to slidably support the gear testing tool T. From the front 12 of the base, a flat table-like portion 13 may extend rearwardly, this portion of the base being provided with a T-slot 14 for the reception of a locking nut 15 having a handle 16 operable over a screw 17 for locking a slide 18 on the table or slideway 13. The slide 18 may revolubly support a post 19 carrying a worm gear 20, which, as best shown in Fig. 5, meshes with a worm 21 which may be turned by the knurled wheel 22. Thus the post may be rotated and, in addition, it may be held in a set position by a screw 23 passing through the pinch lugs 24.

It is customary to set the slide 18 in the desired position to cause the work gear W to be in position to mesh with the worm rack T.

Figure 4:
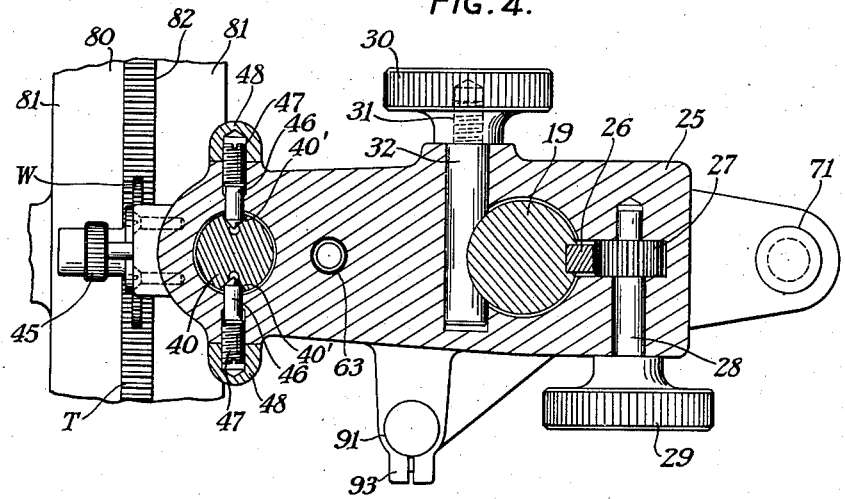
Fig. 4 is a fragmentary detail section taken on line 4—4 of Fig. 2.

The post 19 also carries a head 25 which may be raised and lowered on the post 19 by means of a rack 26 with which a gear 27 meshes. Gear 27 is carried by a shaft 28 and may be operated by the knurled wheel 29. Referring to Fig. 4 the post 19 may be locked in any set position by a hand wheel 30 which may be turned to operate the screw 31, thus drawing the locking bar 32 into locking engagement with the post 19 thereby holding the head 25 in its set position.

The head 25 constitutes a portion of the work holder. The work gear W may be mounted on a shaft 33 which can conveniently have a tapered portion 34 mating with a tapered aperture 35 and this shaft may be held in place by a thumb screw 36 having a threaded engagement at 37 with the shaft 35. Set screws 38 by entering a groove 39 in the nut 36 hold the shaft with extreme accuracy in its proper position in which it may move to and from the gear testing tool T in the following manner.

The shaft 34 is carried by a plunger 40 mounted to slide in bearings 41 and 42 in the head 25. The extent of movement may be controlled by a pin 43 entering a notch 44, this pin being movable to and from the notch by means of a hand wheel 45. A pair of pins 46, best shown in Fig. 3, adjustable by the screws 47 which are covered by cap screws 48, accurately guide the plunger by entering the grooves 40' therein. An anvil 49 extends upwardly through the top or cap 50 and into a position in which it may be engaged by the plunger 51 of an indicator 52 of the type including a movable ring 53 extending around the outside of the indicator so that the arrow 54 may be set back to a zero position as shown in Fig. 6 through movement of the ring 53.

Thus, if the work gear W is meshed with the testing tool T, as in Fig. 6, and the testing tool which is a worm section is moved back or forth by means of a knob 55, a shaft 56, a gear 57 and a rack 58 carrying a pin 5 meshing with the worm section coupling 4, deviations from the theoretically perfect gear can be determined. To do this deviations of the pointer 54 from the zero position are noted and since each graduation on the scale 60 may be in units of ten-thousandths of an inch, the eccentricity of the gear or the imperfections of any gear tooth will become immediately apparent and the extent of the imperfections will also appear on the indicator.

Referring to Figs. 9, 10 and 11, it will be noticed that a high degree of accuracy of measurement can be made because the testing tool T in Fig. 9, $T^1$ and $T^2$ in Figs. 10 and 11, all include teeth 6 having lateral curvature. This lateral curvature is exaggerated in these drawings to more clearly bring out the fact that there will be only contact in a single plane A (Figs. 10 and 11) through the work gear $W^1$ and $W^2$ and the worm section $T^1$ and $T^2$. This is an advantage because by moving the work gears transversely of the axis A the contour of any portion of the teeth throughout their length can be readily tested.

Figs. 1 and 9 illustrate a typical arrangement of a work piece or gear W and a testing tool T. I generally prefer to have the work gear W of somewhat less width than the length of the individual teeth on the worm section.

Fig. 10 shows another embodiment of my invention in which the tool $T^1$ is many times as wide as the thickness of the work gear $W^1$ and in Fig. 11 the work gear $W^2$ is quite a lot wider than the tool $T^2$. However, the relative widths of the testing tool and the thickness of the work gears are largely a matter of selection and not highly important.

Returning to Fig. 2, it will be noticed that the plunger 40 carried by the head 25 also carries a transverse arm 61 which contacts a plunger 62 pressed upwardly by a spring 63 and adjustable by a screw 64. I prefer to adjust this spring so that it slightly under counterbalances the weight of the plunger 40, the shaft 34 and the work gear W, so that the work gear W will rest against the worm section T with a light pressure but can easily be raised therefrom either manually or in minute amounts due to imperfections in the work gear.

The indicator 52 may conveniently be carried by a shaft 65 adjustable by a screw 66 in a bearing 67 so that the initial setup of the indicator can be easily and accurately made.

Figs. 1 and 2, as well as Fig. 4, show my testing machine setup for testing gears with teeth parallel to the axis of the gear. However, a worm section T as above explained is suitable for testing any other gears having the same tooth system of the same pitch-size, and if it should be desired to test a work gear $W^3$ in which the teeth 70 are not parallel to the axis of the gear, the tester may be readily setup as indicated in Fig. 5 by turning the post 19 so that the head 25 will turn through the required angle.

In order to determine the required angle I have provided a pair of pins 71 mounted on the head 25 and 72 mounted on the slide 18. These pins are of known diameter—say one-half inch—and each pin is provided with a half flat end 73 and 74, these flats being accurately faced. The pins 71 and 72 are held in place by set screws 75 and 76 and when the flats 73 and 74 lie smoothly in contact the axis of the shaft 34 is at right angles to the slideways 11 and when the pins are separated this angle varies.

Since the centers of the pins 71 and 72 relative to the center of the post 19—that is the distance D—is known, it is a simple matter to set the head 25 for any required gear lead angle by figuring out the chord of the subtended angle and by using a micrometer 77 to measure the angle $a$ between the centers of the two pins as indicated in Fig. 5. Thus, the instrument can be readily set up for a gear having teeth of any lead angle. By moving the gear relative to the worm section as before, imperfections in the gear can be determined from the indicator 52. It is also possible to set the angle by means of gauge blocks between the flatted ends of gauge plugs.

This feature of the machine may be utilized for determining whether the lead angle of the work piece $W^3$ being tested is correct. If the instrument should be set for a lead angle of, say, 30° and the gear should have been imperfectly cut, by oscillating the head 25 slightly back and forth with the work gear $W^3$ meshing with the gear testing tool or worm section T, the lowest position as shown by the indicator 52 will necessarily indicate that the teeth of the work gear $W^3$ are in angular alignment with the tool T. By then measuring the distance between the posts 71 and 72 the angle $a$ may be determined by measuring chord of the subtended arc. Thus it is a simple matter to determine the actual lead angle of teeth.

In order to prevent dust or dirt from getting between the V-shaped rails 11 on the base 10, and between the corresponding V-shaped rails 2 on the worm section, I prefer to provide a cover plate 80 having downwardly extending flanges 81 and having an aperture 82 of a size to receive the upwardly projecting portion 83 of the worm section as best shown in Fig. 8. An aperture strip 84 may be employed to raise the cover 80 to avoid contact with the rails 11 if the shape of the worm section requires it.

It should be noticed that the tool T (Fig. 6) includes a pad 90 on the end of this tool. This pad bears a definite relationship to the pitch line of the worm section T and to the pitch diameter of the work gear W and preferably the pad 90 forms a gauge block exactly on the pitch line. The reason for this is that, by sliding the tool T until the pad 90 lies beneath a shaft 34 of known diameter which may support the work gear W, this pad may be used with suitable test blocks, such as Johansson test blocks, to determine accurately the center position of a work gear. For most purposes the most convenient way to obtain the pitch diameter of a gear is to use this pad 90 with a test block, but I also provide a second means for determining this by means of a built-in micrometer 91, the plunger of which 92 is carried in a bracket 93 and the anvil 94 of which is carried by a bracket 95 and may be positioned by a set screw 96. The adjustable bracket 95 may be mounted to slide upon the post 19 and may be locked in a set position by means of the knob 97', the notched shaft 97 and the screw 98. By turning the knob 96 the curved notch pinches the shaft 19 holding the bracket in a set position.

A micrometer 91 may be used in setting up the machine in the following manner.

The pitch line pad 90 of the gear testing tool may be moved in alignment with the shaft 33 and the head 25 may be lowered until the shaft rests upon the pad 90. The diameter of the shaft 33 is known and if it is desirable to accurately raise the shaft any distance, such as for instance 1", the nut 96 is released and the anvil 94 is brought into contact with the plunger 92 at a known reading, as for instance a zero reading. The head 25 is then raised and by turning down the plunger 92 the required 1", for instance, and bringing it into contact with the anvil 94, the exact distance between the shaft 33 and the pad 90 is known.

It is usually desirable to move the worm section T a distance necessary to turn the work gear W through 360° in order to test all of the teeth on the gear and I provide a pair of stops on the ends of the V-shaped rails 11, one of which is shown in Fig. 6. This stop may consist of a stop block 98 and a nut 99 moving in the slideway 100, there being a screw 101 and a screw head 102 by which this stop may be adjusted. Thus, in setting up the machine for testing a gear of known diameter the stops are placed one on each side of the rack driving the worm section a distance sufficient to contact with the ends 103 and 104 of the rack driving the worm section when it has been moved a distance sufficient to rotate the gear W exactly one revolution.

It should be especially noticed that my machine is adapted for testing not only simple spur gears, but it is also particularly useful for testing helical gears as well. The teeth may be either right or left hand.

It is also noted that another useful feature of my machine is that it may be used for testing gears with thin teeth which would ordinarily bottom in the teeth of the master tool. This can be done by altering the angular setting between the work gear and the worm section tool; this in effect thickening the teeth of the worm section tool. It is obvious that one skilled in the art of gears and gear testing will find many other uses for my machine in addition to its primary function of testing the usual types of gears and production testing.

I have shown an indicator 52 mounted directly upon my instrument, but if desired an indicating measuring device may be placed separated from the machine and may be electrically connected thereto. A suitable device is on the market, being known as an Electro limit gauge, supplied by Pratt & Whitney. This comes with a very large dial graduated into units of one ten-thousandth of an inch and is very easy to attach and use.

While I have described and illustrated a preferred embodiment of my gear checking machine in which a rack-like tool, which is actually a worm section, is used as the master member, it is obvious that various other embodiments can be devised which come within the scope of the appended claims.

What I claim is:

1. In a gear checking machine, the combination with a base, of a slideway thereon, a worm section rack mounted to slide in the slideway, means for moving the worm section rack carried by the base, a bracket for revolubly carrying a gear to be tested with the teeth thereof meshing with worm section rack; said bracket comprising a slide movably mounted on the base, a vertical post carried by the slide, and means for turning the post about its own axis.

2. In a gear checking machine, the combination with a base, of a slideway thereon, a worm section mounted to slide in the slideway, means for moving the worm section carried by the base, a bracket for revolubly carrying a gear to be tested with the teeth thereof meshing with worm section, said bracket comprising a slide movably mounted on the base, a vertical post carried by the slide, a head slidably mounted on the post, said head including a gear supporting shaft, and a plunger carrying the gear supporting shaft slidably mounted on the head.

3. In a gear checking machine, the combination with a base, of a slideway thereon, a worm section mounted to slide in the slideway, means for moving the worm section rack carried by the base, a bracket for revolubly carrying a gear to be tested with the teeth thereof meshing with worm section, said bracket comprising a slide movably mounted on the base, a vertical post carried by the slide, a head slidably mounted on the post, said head including a gear supporting shaft, and a plunger carrying the gear supporting shaft slidably mounted on the head, a counterbalance connected to the plunger of insufficient strength to raise the plunger whereby a gear carried by said plunger may normally mesh with said worm section.

4. In a gear checking machine, the combination with a base, of a slideway thereon, a worm section mounted to slide in the slideway, means for moving the worm section carried by the base, a bracket for revolubly carrying a gear to be tested with the teeth thereof meshing with worm section rack, said bracket comprising a slide movably mounted on the base, a vertical post carried by the slide, a head slidably mounted on the post, said head including a gear supporting shaft, and a plunger carrying the gear supporting shaft slidably mounted on the head, and a micrometer anvil also carried by the plunger, a micrometer mounted directly above the anvil and contacting therewith to measure movements of said plunger.

5. In a gear checking machine, the combination with a base, of a slideway thereon, a worm section mounted to slide in the slideway, means for moving the worm section carried by the base, a bracket for revolubly carrying a gear to be tested with the teeth thereof meshing with worm section rack, said bracket comprising a slide movably mounted on the base, a vertical post carried by the slide, a head movably mounted on said post, means for changing the angular relation between the head and slide and means for defining the angular relation comprising a pair of round pins equally spaced from the post.

6. In a gear checking machine, the combination with a base, of a slideway thereon, a worm section mounted to slide in the slideway, means for moving the worm section carried by the base, a bracket for revolubly carrying a gear to be tested with the teeth thereof meshing with worm section, said bracket comprising a slide movably mounted on the base, a vertical post carried by the slide, a head movably mounted on said post, means for changing the angular relation between the head and slide and means for defining the angular relation comprising a pair of round pins equally spaced from the post, each of said pins including a half round and half flat end area positioned to contact the half flat areas in a predetermined relation.

7. In a gear checking machine, the combination with a base, a slideway thereon, a worm section mounted in the slideway, means on the base for moving the worm section, means carried by the base for resiliently supporting a gear to be tested with the teeth thereof in mesh with the teeth of the worm section, and a test block carried by the worm section and including a means for determining the pitch diameter of the gear therefrom.

8. In a gear checking machine, the combination with a base, a slideway thereon, a worm section mounted in the slideway, means on the base for moving the worm section, means carried by the base for resiliently supporting a gear to be tested with the teeth therefrom in mesh with the teeth of the worm section, and a slideway cover closely fitting the worm section and movable therewith to exclude foreign matter therefrom.

9. In a gear checking machine, the combination with a base, a slideway thereon, a worm section mounted in the slideway, means on the base for moving the worm section, means carried by the base for resiliently supporting a gear to be tested with the teeth thereof in mesh with the teeth of the worm section, and adjustable stop members carried by the slideway for limiting movement of the worm section.

10. In a gear checking machine, the combination with a base, a slideway thereon, a worm section mounted in the slideway, means on the base for moving the worm section, means carried by the base for resiliently supporting a gear to be tested with the teeth thereof in mesh with the teeth of the worm section, said means for moving the worm section on the base including a rack and pinion.

11. In a gear checking machine, the combination with a base, a slideway thereon, a worm section mounted in the slideway, means on the base for moving the worm section, means carried by the base for resiliently supporting a gear to be tested with the teeth thereof in mesh with the teeth of the worm section, said means for moving the worm section on the base including a rack and pinion and a coupling between the worm section and the rack and pinion for transmitting motion.

12. In a gear checking machine, the combination with a base, a slideway thereon, a worm section mounted on the slideway, means on the base for moving the worm section, means carried by the base for resiliently supporting a gear to be tested with the teeth thereof in mesh with the teeth of the worm section, a cover for the slideway, said cover including an aperture closely fitting the worm section and adapted to be moved thereby.

13. In a gear checking machine, the combination with a base, a slideway thereon, a worm section mounted in the slideway, means on the base for moving the worm section, means carried by the base for moving the worm section, means carried by the base for resiliently supporting a gear to be tested with the teeth thereof in mesh with the teeth of the worm section, a cover extending over the slideway, said cover including an aperture closely fitting the worm section and adapted to be moved thereby, said cover being supported solely by the worm section and extending therefrom into a slideway protecting position.

14. In a gear checking machine, the combination with a base, a slideway thereon, a worm section mounted in the slideway, means on the base for moving the worm section, means carried by the base for resiliently supporting a gear to be tested with the teeth in mesh with the teeth of the worm section, a means carried by the base for moving the worm in its slideway, and a loose coupling between the means for moving the worm in its slideway and the worm whereby the worm may always lie firmly on and be supported solely by the slideway.

LOUIS D. MARTIN.